Feb. 22, 1949.  A. R. RODERICK  2,462,225
SAW FILING MACHINE
Filed Jan. 31, 1947  2 Sheets-Sheet 1
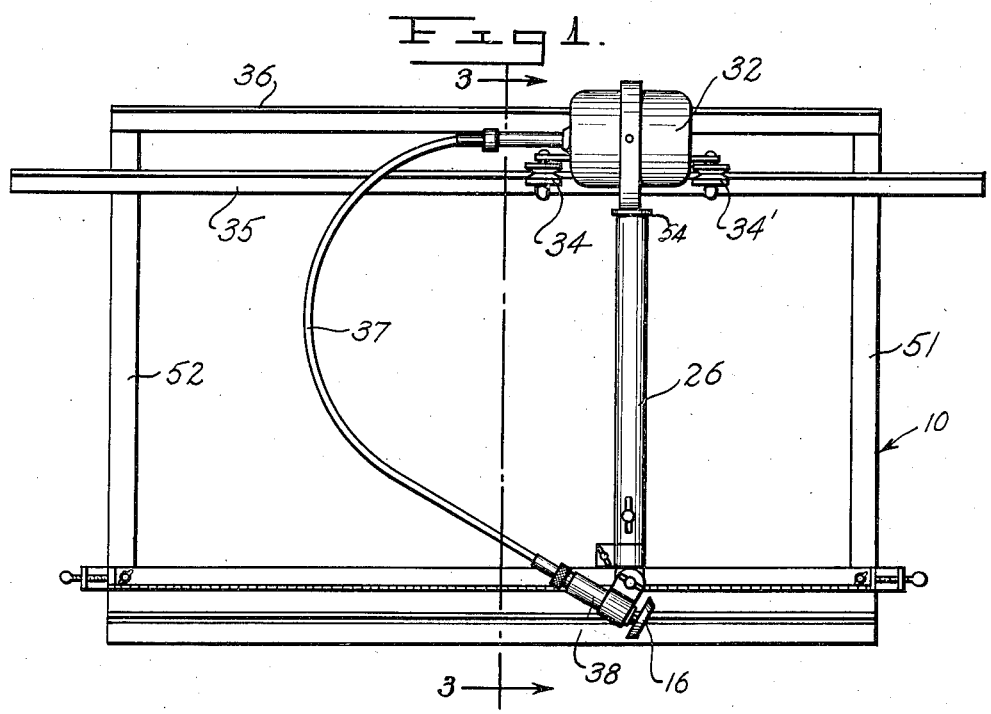
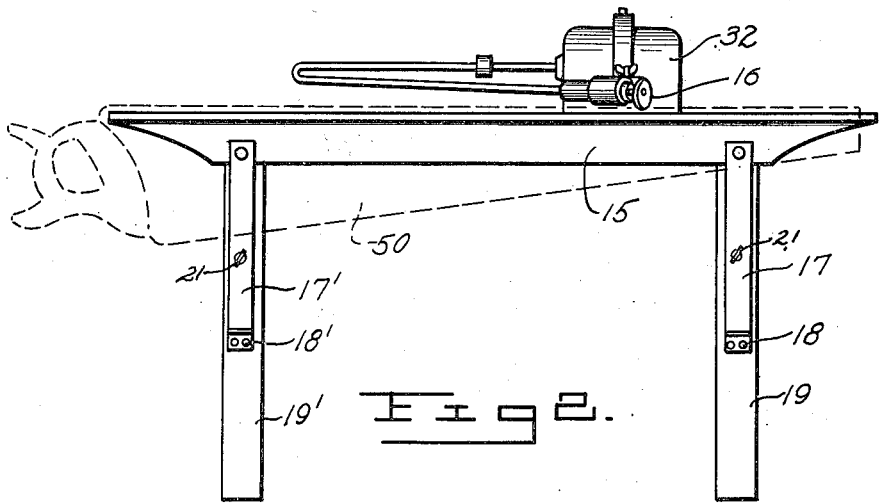
Inventor
Arthur R. Roderick
By McMorrow, Berman & Davidson
Attorneys Feb. 22, 1949.  A. R. RODERICK  2,462,225
SAW FILING MACHINE
Filed Jan. 31, 1947  2 Sheets-Sheet 2
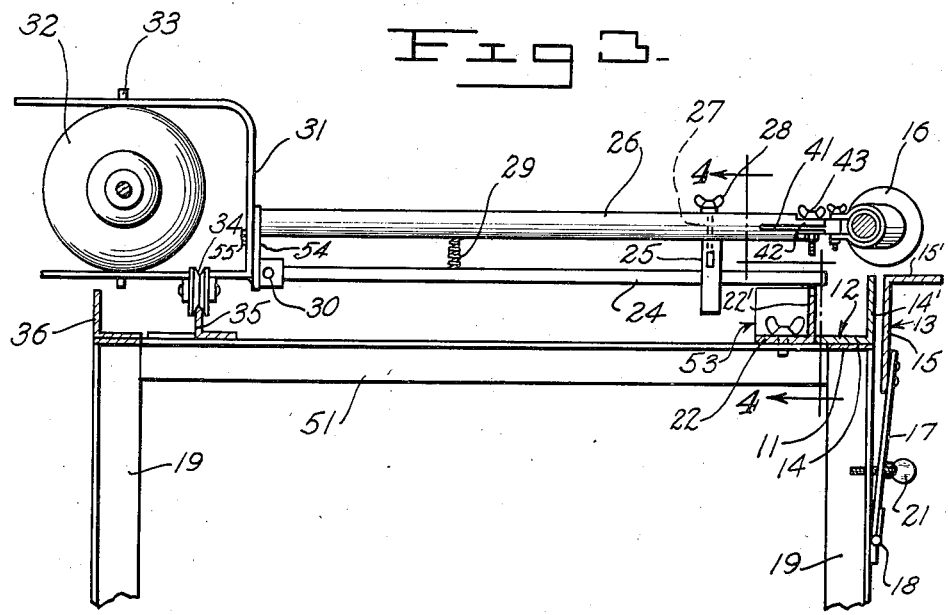
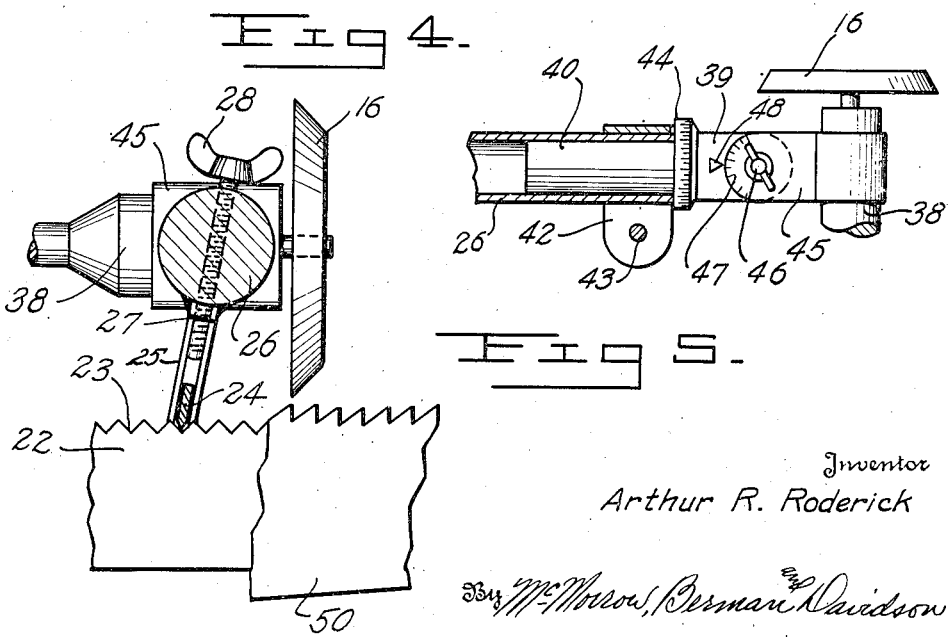
Inventor
Arthur R. Roderick Patented Feb. 22, 1949

2,462,225

UNITED STATES PATENT OFFICE 2,462,225

SAW FILING MACHINE

Arthur R. Roderick, Eagle River, Wis.

Application January 31, 1947, Serial No. 725,578

2 Claims. (Cl. 76—41)

This invention relates to saw-filing machines.

An object of the present invention is to provide a saw-filing machine adapted for sharpening saws, such as hand saws, whether rip or cross-cut saws, band and circular saws.

Another object of the present invention is to provide a saw-filing machine having a clamping means for supporting a saw to be sharpened, so that the teeth thereof project upwardly, and means in association with the clamping means for lining up the teeth of the supported saw for operation thereon by a sharpening tool.

A further object of the present invention is to provide a saw-filing machine in which a portable, motor-driven, flexible shaft sharpening tool is utilized for operation upon the saw teeth.

A still further object of the present invention is to provide a saw-filing machine in which the cutting or sharpening tool is capable of universal adjustment with respect to the teeth of the saw to be sharpened.

A still further object of the present invention is to provide a saw-filing machine which eliminates the complicated gear mechanisms of the machines heretofore proposed, and which is simple in construction, and highly efficient in operation.

For other objects, and for a better understanding of the invention, reference may be had to the following detailed description taken in connection with the accompanying drawings, in which:

Figure 1 is a plan view of the saw-sharpening machine showing the arrangement set up for operation upon the saw blade.

Figure 2 is a side elevational view of the saw-sharpening machine and looking upon the side thereof and upon the end of the cutting disc or tool.

Figure 3 is an enlarged transverse cross-sectional view taken on line 3—3 of Figure 1, and looking in the direction of the arrows thereof.

Figure 4 is a detail view looking upon the notched guide bar and in section through the spring hold-down bar adapted to engage with the notches of the guide bar, the view being taken on line 4—4 of Figure 3, and looking in the direction of the arrows thereof.

Figure 5 is an enlarged fragmentary view of the flexible shaft and looking in plan upon the clamping device for fixing the flexible shaft and the cutting disc in the proper angular position upon the end of a supporting tube and with relation to the saw blade fixed to the frame beneath the tool.

Referring now to the figures, 10 represents a rectangular table frame on the front longitudinally extending member 11 of which is fixedly mounted an angle bar 12, the mounting of said bar being such that one of its legs 14 rests upon the member 11 with the other leg 14' projecting upwardly and in alignment with the edge of the member 11. Mounted for movement toward and away from the face of the leg 14' of the fixedly mounted angle bar 12 is a longitudinally extending angle bar or clamping bar 13, said bar 13 being so arranged that its legs 15 and 15' are oppositely disposed to the legs 14 and 14' of the angle bar 12. The lower end of the leg 15 of the bar 13 is attached to a pair of vertically disposed members 17 and 17' hingedly connected, as at 18 and 18', to one of the pair of table legs 19 and one of the pair of legs 19'. Threaded through the vertically disposed member 17 and the leg 19, Figure 3, is a screw 21. A screw is likewise threaded through the vertically disposed member 17' and the leg 19', but since this is identical in structure and arrangement, only the screw 21 and its disposition and arrangement with member 17 and leg 19 is shown. The tightening of the screw 21 on the leg 19 and the screw 21 on the leg 19' will cause the clamping bar 13 to be advanced toward the face of the leg 14' of the angle bar 12 and clampingly hold a saw 50 to be sharpened therebetween, Figure 2.

Positioned to the rear of the angle bar 12 and rigidly supported upon the cross-bar members 51 and 52 of the frame 10 is an angle bar member 53, said bar 53 having its legs 22 and 22' arranged in the same manner as the legs 14 and 14' of the angle bar member 12. The upper edge of the leg 22' of the bar member 53 is provided with a plurality of notches 23, any one of said notches being adapted to receive and support a lateral bar 24. The bar 24 is retained against lateral displacement by a guide member 25 which depends from a tool arm 26. The guide 25 is rigidly secured to the tool arm 26 by an adjusting screw 27 which extends through the tool arm and is operated by turning the winged head 28. This adjusting screw 27 serves as a stop against which the bar 24 will rest when it has been pivoted upwardly toward the tool arm 26 in a slot formed in guide 25 against the action of spring 29. The lateral arm 24 is pivoted at 30 to a frame 31 which supports the driving motor 32. Driving motor 32 has trunnions 33 extending through portions of the frame 31 and can swing or pivot laterally on the trunnions. The frame 31 has two grooved wheels 34 and 34' adapted to travel along an iron rail or angle member 35. The weight of the motor will normally pivot the tool arm upwardly to remove a cutting tool 16 from the saw teeth. When the tool arm is in its upwardly pivoted position, the bottom of the frame 31 engages the upper edge of the angle bar member 36 of the frame 10, thereby holding the motor on the frame.

The motor 32 has a shaft extension 37 which is of the flexible type and which has on its outer end a tool head 38. This shaft 37 extends toward one end of the table and then is bent to be brought toward the forward end of the tool arm 26 so that its head 38 bearing the cutting or sharpening tool or disc 16 can be supported upon the forward end of the tool arm at an angle thereto. Means to be described permit angular adjustment of the tool 16 relative to the saw teeth whereby such teeth may be cut at the proper angle.

As a means for obtaining the proper angular adjustment of the cutting tool 16, there is provided an adjustable holder 39 which is fixed by an attaching stem 40 within the end of the hollow tool arm 26. The end of the tool arm is split, as indicated at 41, and is drawn together by a clamping ring 42 and a clamping screw 43 extending through the separable ends of the ring. By loosening the clamp 42, the device 39 can be angularly adjusted on the end of the tool arm and in accordance with a scale 44. The adjustable holder 39 is of two parts and includes a clamp 45 which surrounds the shaft head 38. This clamp 45 is retained by a clamping screw 46 and has a rounded scale portion 47 from which a reading can be taken by reference to an index projection 48.

Once the cutting tool has been properly adjusted with reference to a saw tooth and is ready to perform consecutive sharpening operations upon every second tooth, the tool arm 26 is grasped and is fed along so as to make the cut upon the saw blade.

The end of the tool arm 26 is secured to the motor frame 31 through a bearing plate 54 by an adjusting screw 55 that may be loosened to adjust the angle of the lateral bar 24, as shown in Figure 4, and then tightened to lock the tool arm in the desired position. This makes it possible to sharpen cross-cut saws in which one side of the teeth is perpendicular, wherein the cutting tool must travel at an angle in order to sharpen both sides of the teeth.

The lateral bar 24 will be registered with notches 23 on the guide 53. Upon registering the end of the lateral bar 24, pressure will be exerted to move the tool arm downwardly, and this downward movement will be against the action of spring 29 and will continue until the lower end of the screw 27 has engaged with the upper edge of the lateral bar within the depending guide 25 on the tool arm. These operations will continue throughout the length of the saw. Thereafter, the saw will be either turned around or the cutting tool 16 will be readjusted to cut the teeth which extend in the opposite direction from the teeth which have already been cut or sharpened.

Having now described my invention, I claim:

1. In a saw-sharpening machine, a table, clamping means on a longitudinally extending side of said table adapted to support a saw to be sharpened so that the teeth thereof project upwardly, a frame mounted for reciprocating travel on said table, a motor on said frame, a transversely disposed tool arm carried by said frame, a cutting tool, a flexible shaft operatively connecting said tool to said motor, means for attaching said cutting tool to said tool arm in a predetermined position for operation on the teeth of the saw, said attaching means comprising a head on said cutting tool, and a holder provided with a clamp adjustably secured to an end of said tool arm, said clamp embracing said head and secured thereto.

2. In a saw-sharpening machine including a stationary frame including means for clamping a saw thereto, a carriage mounted on said frame for movement along the same in parallel relation to said saw, a motor including a flexible shaft mounted on said frame and a rotary saw-sharpening tool operatively connected to said shaft, the improvement comprising a tool arm fixed to said carriage and extending outwardly thereof, said arm having a free end in the region of said saw, said free end being formed with a cylindrical socket therein, a stem slidable and pivotable in said socket, means on said stem and socket providing a scale for pivotally adjusting said stem in a predetermined setting relative to said arm, means for releasably locking said stem in a selected adjusted position, said tool including a stationary head, connecting means pivotally connecting said head to said stem, means on said head and stem providing a second scale for angularly adjusting said tool and head relative to said stem to predetermined angular settings, and means for releasably locking said tool and head in a predetermined angularly-adjusted position relative to said stem.

ARTHUR R. RODERICK.

REFERENCES CITED

The following references are of record in the file of this patent:

UNITED STATES PATENTS

| Number | Name | Date |
|---|---|---|
| 1,182,615 | Armstrong | May 9, 1916 |
| 1,224,293 | Foley | May 1, 1917 |
| 1,762,854 | Cooper et al. | June 10, 1930 |
| 1,852,518 | Harrison | Apr. 5, 1932 |
| 2,217,145 | Stihl | Oct. 8, 1940 |
| 2,329,879 | Christy et al. | Sept. 21, 1943 |
| 2,376,941 | Schoen | May 29, 1945 |

FOREIGN PATENTS

| Number | Country | Date |
|---|---|---|
| 670,747 | Germany | Jan. 26, 1939 |